(12) United States Patent
Jungnickel et al.

(10) Patent No.: US 10,080,427 B2
(45) Date of Patent: Sep. 25, 2018

(54) ORAL CARE IMPLEMENT AND METHOD FOR MANUFACTURING THE SAME

(71) Applicant: Braun GmbH, Kronberg (DE)

(72) Inventors: Uwe Jungnickel, Koenigstein/Taunus (DE); Benedikt Heil, Friedberg (DE)

(73) Assignee: BRAUN GMBH, Kronberg (DE)

( * ) Notice: Subject to any disclaimer, the term of this patent is extended or adjusted under 35 U.S.C. 154(b) by 674 days.

(21) Appl. No.: 14/540,700

(22) Filed: Nov. 13, 2014

(65) Prior Publication Data

US 2015/0128367 A1 May 14, 2015

(30) Foreign Application Priority Data

Nov. 13, 2013 (EP) .................................... 13192697

(51) Int. Cl.
| | |
|---|---|
| A46B 5/02 | (2006.01) |
| A46B 9/12 | (2006.01) |
| A46D 3/00 | (2006.01) |
| A46B 3/04 | (2006.01) |
| A46B 5/00 | (2006.01) |
| A46B 7/00 | (2006.01) |
| B29L 31/42 | (2006.01) |
| B29C 45/14 | (2006.01) |

(52) U.S. Cl.
CPC .................. *A46B 9/12* (2013.01); *A46B 3/04* (2013.01); *A46B 5/00* (2013.01); *A46B 5/02* (2013.01); *A46B 7/00* (2013.01); *A46D 3/005* (2013.01); *B29C 45/14467* (2013.01); *A46B 2200/1066* (2013.01); *B29C 45/14385* (2013.01); *B29L 2031/425* (2013.01)

(58) Field of Classification Search
CPC ........... A46B 3/04; A46B 5/00; A46B 5/0029; A46B 7/00
USPC ..................................................... 15/188, 193
See application file for complete search history.

(56) References Cited

U.S. PATENT DOCUMENTS

| | | | | |
|---|---|---|---|---|
| 585,358 A | * | 6/1897 | Gould ........................... | 15/176.4 |
| 1,567,507 A | * | 12/1925 | Howard .................... | A46B 7/04 |
| | | | | 15/176.1 |
| 1,770,195 A | * | 7/1930 | Burlew ..................... | A46B 9/04 |
| | | | | 15/167.1 |
| 1,861,347 A | * | 5/1932 | Johnson ................. | A46B 9/005 |
| | | | | 15/104.94 |
| 2,129,082 A | * | 9/1938 | Byrer ..................... | A46B 15/00 |
| | | | | 15/110 |

(Continued)

OTHER PUBLICATIONS

International Search Report with Written Opinion, dated Jan. 22, 2015, 8 pages.

*Primary Examiner* — Joseph J Hail
*Assistant Examiner* — Arman Milanian
(74) *Attorney, Agent, or Firm* — Vladimir Vitenberg

(57) ABSTRACT

An oral care implement comprises a first and a second part. The first part has a carrier plate having a back side and a front side opposite the back side, and at least one cleaning element extending from the front side. The second part has a support plate and at least a portion of a neck, the support plate having a front side and a back side opposite the front side. The back side of the carrier plate is secured to the front side of the support plate by means of a plastic material molded around at least a portion of the back side of the support plate and over at least a portion of the carrier plate to provide a non-detachable connection between the first and the second part.

13 Claims, 3 Drawing Sheets

(56) References Cited

U.S. PATENT DOCUMENTS

| | | | | |
|---|---|---|---|---|
| 3,103,680 | A * | 9/1963 | Krichmar | A46B 7/04 15/167.1 |
| 4,633,542 | A * | 1/1987 | Taravel | A46B 5/0029 15/167.1 |
| 4,683,604 | A * | 8/1987 | Rueb | A46B 7/04 15/145 |
| 5,058,230 | A * | 10/1991 | Hodosh | A46B 7/04 15/167.1 |
| 5,373,602 | A * | 12/1994 | Bang | A46B 5/0025 15/106 |
| 5,875,510 | A * | 3/1999 | Lamond | A46B 5/0095 15/167.1 |
| 5,970,564 | A * | 10/1999 | Inns | A46B 5/0025 15/167.1 |
| 5,991,959 | A * | 11/1999 | Raven | A46B 5/0029 15/167.1 |
| D420,804 | S * | 2/2000 | Juhlin | D4/104 |
| 6,145,152 | A * | 11/2000 | Ward | A46B 7/04 132/323 |
| 6,161,245 | A * | 12/2000 | Weihrauch | A46B 7/06 15/167.1 |
| 6,178,582 | B1 * | 1/2001 | Halm | A46B 5/0025 15/167.1 |
| 6,311,358 | B1 * | 11/2001 | Soetewey | A46B 9/06 15/110 |
| D477,465 | S * | 7/2003 | Reilly | D4/104 |
| D501,084 | S * | 1/2005 | Schaefer | D4/104 |
| 6,886,207 | B1 * | 5/2005 | Solanki | A46B 9/028 15/110 |
| 6,988,777 | B2 * | 1/2006 | Pfenniger | A46B 3/06 15/167.1 |
| 7,073,225 | B1 * | 7/2006 | Ford | A46B 7/04 132/310 |
| 7,721,376 | B2 * | 5/2010 | Hohlbein | A46B 15/0055 15/110 |
| 7,725,981 | B2 * | 6/2010 | Moskovich | A46B 5/0025 15/167.1 |
| 7,836,539 | B2 | 11/2010 | Moskovich et al. | |
| 7,845,042 | B2 * | 12/2010 | Moskovich | A46B 15/0055 424/65 |
| D632,084 | S * | 2/2011 | Baertschi | D4/104 |
| 7,908,699 | B2 * | 3/2011 | Hohlbein | A46B 9/04 15/110 |
| 8,091,170 | B2 | 1/2012 | Moskovich et al. | |
| 8,448,287 | B2 * | 5/2013 | Ponzini | A46B 7/042 15/176.1 |
| 8,776,302 | B2 * | 7/2014 | Baertschi | A46B 9/005 15/143.1 |
| 8,800,093 | B2 | 8/2014 | Moskovich et al. | |
| 8,806,695 | B2 * | 8/2014 | Moskovich | A46B 9/04 15/167.1 |
| 8,857,003 | B2 * | 10/2014 | Hohlbein | A46B 5/002 15/110 |
| 9,185,967 | B2 * | 11/2015 | Geiberger | A46B 3/20 |
| 9,586,350 | B2 * | 3/2017 | Jimenez | A61B 17/244 |
| 2002/0166188 | A1 * | 11/2002 | Driesen | A47K 7/024 15/160 |
| 2005/0038461 | A1 * | 2/2005 | Phillips | A61B 17/244 606/161 |
| 2005/0138743 | A1 * | 6/2005 | Huber | A46B 9/04 15/167.1 |
| 2006/0026784 | A1 | 2/2006 | Moskovich et al. | |
| 2007/0163064 | A1 * | 7/2007 | Wong | A46B 5/0025 15/143.1 |
| 2007/0271717 | A1 * | 11/2007 | Clos | A46B 3/20 15/167.1 |
| 2008/0174165 | A1 * | 7/2008 | Russell | A46B 9/04 300/21 |
| 2009/0025165 | A1 * | 1/2009 | Moskovich | A46B 5/0025 15/167.1 |
| 2010/0275397 | A1 | 11/2010 | Moskovich et al. | |
| 2012/0073072 | A1 | 3/2012 | Moskovich et al. | |
| 2013/0291320 | A1 * | 11/2013 | Kirchhofer | A46B 1/00 15/22.1 |

* cited by examiner

ORAL CARE IMPLEMENT AND METHOD FOR MANUFACTURING THE SAME

FIELD OF THE INVENTION

The present disclosure is concerned with an oral care implement comprising a first and a second part. The first part comprises a carrier plate with at least one cleaning element extending from a front side and the second part comprises a support plate and at least a portion of a neck. Further, the present disclosure is directed to a method for manufacturing such an oral care implement.

BACKGROUND OF THE INVENTION

Oral care implements, in particular manual toothbrushes, as well as methods for manufacturing the same are well known in the art. Generally, cleaning elements are attached to a toothbrush head intended for insertion into a user's oral cavity. A grip handle which is held by the user during brushing is usually attached to the head via a neck portion extending between the head and the handle.

According to one method for manufacturing toothbrushes known in the art, ends of bristle tufts—which might be optionally fused to form a ball-like structure—are inserted into a mold cavity and a first synthetic component is injection molded around these bristle ends to form a bristle carrier. The bristle carrier is then transferred to a further mold cavity in which the brush body is injection molded around the bristle carrier. This process, however, merely provides low degree of flexibility in terms of combining different shapes of handles with various toothbrush heads as the production process is fixed due to given mold cavities.

In order to enable the production of different types of brushes in a simple manner, a process is known, wherein bundles of bristles are embedded in a bristle carrier by their fastening side ends. The bristle carrier is connected to a brush body wherein an intermediate layer of an additional material component is provided between the bristle carrier and the brush body. The brush body and the bristle carrier may be connected to the additional material component by partial fusing. The part of the brush body to which the bristle carrier is connected has the form of a bowl to receive the intermediate layer and the bristle carrier. However, said method does not allow the combination of various kinds of brush heads/bristle carriers with brush bodies as the shape of the bristle carrier has to fit into the bowl of the brush body. Thus, the flexibility of combining various types of bristle carriers with a given brush body and vice versa is still limited.

It is an object of the present disclosure to provide an oral care implement and a method for manufacturing the same, which allows a high degree of flexibility in terms of combining different types of carriers comprising cleaning elements with various types of handles in a simple and cost saving manner.

SUMMARY OF THE INVENTION

In accordance with one aspect, an oral care implement is provided that comprises:
- a first part comprising a carrier plate having a back side and a front side opposite the back side, and at least one cleaning element extending from the front side, and
- a second part comprising a support plate and at least a portion of a neck, the support plate having a front side and a back side opposite the front side, wherein the back side of the carrier plate is secured to the front side of the support plate by means of a plastic material molded around at least a portion of the back side of the support plate and over at least a portion of the carrier plate to provide a non-detachable connection between the first and the second part.

In accordance with one aspect, a method for manufacturing an oral care implement is provided that comprises the steps of:
- providing a first part comprising a carrier plate having a back side and a front side opposite the back side, and at least one cleaning element extending from the front side,
- providing a second part comprising a support plate and at least a portion of a neck, the support plate having a front side and a back side opposite the front side,
- placing the back side of the carrier plate on the front side of the support plate, and
- molding a plastic material around at least a portion of the back side of the support plate and over at least a portion of the carrier plate thereby providing a non-detachable connection between the first and the second part.

In accordance with one aspect, an oral care implement is provided that is manufactured by such process.

BRIEF DESCRIPTION OF THE DRAWINGS

The invention is described in more detail below with reference to embodiments and figures, wherein.

DETAILED DESCRIPTION OF THE INVENTION

Figure 1:
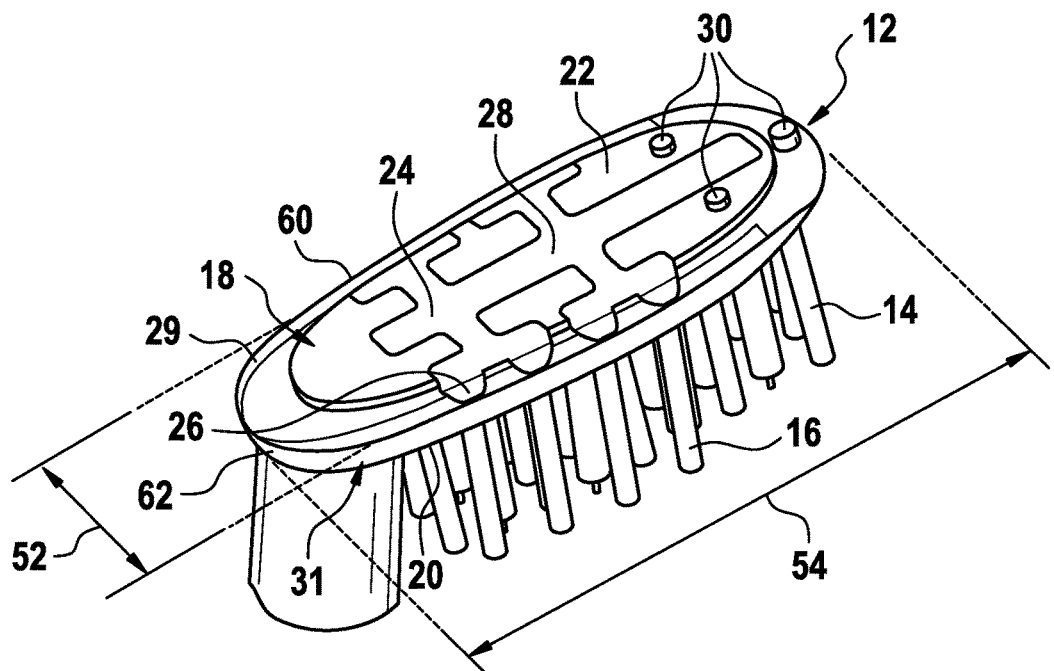
FIG. 1 shows a perspective view of a first part of an example embodiment of an oral care implement.

An oral care implement, which may be a toothbrush—and in some embodiments a manual toothbrush—in accordance with the present disclosure comprises a first and a second part. The first part comprises a carrier plate having a back side and a front side opposite the back side. At least one cleaning element is mounted/fixed on the carrier plate and extends from the front side of the carrier plate. In the following the expression "mounting surface" may also be used for the front side of the carrier plate from which the at least one cleaning element extends.

The second part of the oral care implement comprises a support plate for supporting the carrier plate, and at least a portion of a neck. The support plate has a front side and a back side, wherein the back side is opposite the front side. In some embodiments, the support plate and the portion of the neck may be molded or injection molded in one single molding/injection molding step. In other words, the support plate and the portion of the neck may be integrally formed, i.e. they form a unitary part.

The back side of the carrier plate is secured to the front side of the support plate by means of a plastic material molded around at least a portion of the back side of the support plate and over at least a portion of the carrier plate, i.e. the molded plastic material adheres to both, the first and the second part of the oral care implement. In other words, the back side of the carrier plate is facing the front side of the support plate, i.e. both plates are arranged upon each other and joined together by the plastic material. A non-detachable, i.e. permanent connection between the first and the second part is provided.

In other words, the oral care implement is composed of at least two separate parts which can be produced/manufactured separately, i.e. independently from each other, and can be, at a later stage, matched, i.e. combined together in a further manufacturing step. The support plate is adapted to receive various kinds of carrier plates. Thus, the carrier plate may have the same, bigger or smaller dimensions as the support plate. In other words, the second part does not have to be specific to the first part. For example, the width and/or length extension of the carrier plate may be larger or shorter compared to the width and/or length extension of the support plate. Such an oral care implement allows a high degree of flexibility in the manufacturing process as various types of carrier plates comprising different types of cleaning element patterns can be provided on the support plate. The carrier plate with the at least one cleaning element being secured to the support plate by means of the molded plastic material may be defined as the "head" of the oral care implement.

The back side of the support plate may be partially or substantially covered by the molded plastic material. In case the back side of the support plate is substantially covered by the plastic material this may provide a backside structure of the head being comfortable during use in a user's oral cavity. Optionally, the molded material on the back side of the support plate merges with the proximal end of the neck portion in order to provide a smooth transition zone between the head and the neck. A smooth transition zone, i.e. a zone without a significant step or gap between the head and the neck portion, leads to a comfortable feeling during use of the oral care implement.

The at least one cleaning element extending from the carrier plate may be a tuft comprising a plurality of filaments. The filaments may be made of a polyamide (PA) such as nylon with or without an abrasive such as kaolin clay, polybutylene terephtalate (PBT) with or without an abrasive such as kaolin clay and/or from nylon indicator material colored at the outer surface. The coloring on the nylon indicator material is slowly worn away as the filament is used over time to indicate the extent to which the filament is worn.

Alternatively, the at least one cleaning element extending from the carrier plate may be a thermoplastic elastomer element or, optionally, the carrier plate may further comprise at least one thermoplastic elastomer element for cleaning and/or massaging the teeth and/or soft tissues of the oral cavity. The thermoplastic elastomer element may comprise a unitary structure or a number of substructures. For example, the thermoplastic elastomer element may comprise a large unitary bristle, i.e. a nub, or a number of smaller bristles. The thermoplastic elastomer element may also comprise a fin, a cup such as a prophy cup, or a curved or straight wall.

The at least one cleaning element attached to the carrier plate may extend substantially in a perpendicular direction with respect to the mounting surface of the bristle carrier and/or may be inclined with respect to the mounting surface of the carrier plate. In other words, the at least one cleaning element may be oriented at a specific inclination angle relative to that portion of the mounting surface of the carrier plate from which it extends. The at least one cleaning element may be angled relative to an imaginary line which is tangent to or co-planar with the mounting surface of the carrier plate through which the cleaning element is secured. The at least one cleaning element may be oriented at an angle in a direction that is substantially parallel to the longitudinal extension of the carrier plate and/or orthogonal thereto, i.e. across the width of the carrier plate. In some embodiments, one or more cleaning elements may be tilted in the direction away from or toward the neck portion. Further, cleaning elements can also be oriented at two or more different angles and can also be angled in different directions such as along the length of the carrier plate, across the width of the carrier plate or part way between the length and the width of the carrier plate.

The at least one cleaning element having an inclination angle may improve cleaning properties, in particular with respect to interdental areas, as the inclination of the cleaning element facilitates that the filaments of a tuft, for example, may slide into small gaps between the teeth to clean the interdental areas/gaps. The at least one inclined cleaning element may assure access to narrow spaces and is able to penetrate into the gaps between teeth and remove plaque and other residues more effectively.

Experiments revealed that filaments having an inclination angle from about 65° to about 80°, optionally from about 70° to about 80° are more likely to penetrate into interdental gaps than filaments having an inclination angle outside that range. Filaments having an inclination angle of more than about 80° showed lower likelihood of interdental penetration as these filaments bend away from the direction of travel or skip over the teeth.

In some embodiments the inclination angle may be from about 74° to about 78°, optionally from about 74° to about 75°, further optionally about 74° or about 75°. Surprisingly, it was found, that filaments having an inclination angle from about 74° to about 78°, optionally from about 74° to about 75°, further optionally about 74° or about 75° may further improve cleaning performance of an oral care implement. Experiments revealed that such filaments are even more likely to penetrate into interdental gaps.

In the present context, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference without resulting in a change in the basic function of the subject matter at issue.

Both, the carrier plate and the support plate have a width extension and a length extension. The width and/or the length extension of the carrier plate can be longer or shorter than the width and/or the length extension of the carrier plate. In some embodiments, the width extension and/or the length extension of the carrier plate exceeds the width and/or length extension of the support plate and the plastic material is molded over the portion of the back side of the carrier plate which exceeds the extension of the support plate. Optionally, the carrier plate may further comprise a lip extending from the back side of the carrier plate and being arranged at least partially around the outer circumference of the carrier plate. The lip may substantially prevent the plastic material from flowing over the outer circumferential edge of the carrier plate during the molding/injection molding process. In other words, the first and second parts of the oral care implement are permanently connected by the molded plastic material which adheres to both, the back side of the support plate and the back side of the carrier plate. Such embodiments may provide an even and plain surface structure of the back side of the head resulting in superior/comfortable cleaning experience in a user's oral cavity.

The carrier plate may have an outer circumferential rim which is located between the front side and the back side of the carrier plate, i.e. the outer circumferential rim may be defined as the lateral surface area of the carrier plate. In some embodiments, the molded plastic material may be at least partially molded around said outer circumferential rim. This may provide a unitary surface of the backside and lateral surface of the head of the oral care implement providing a superior user experience. Further, a remaining gap between the support plate and the carrier plate may be sealed along the outer circumference of the head.

In addition or alternatively, the back side of the carrier plate and/or the front side of the support plate may comprise a recess forming a channel between the back side of the carrier plate and the front side of the support plate and the molded plastic material may fill said channel. In some embodiments, said recess may be provided on the back side of the carrier plate and/or on the front side of the support plate at a position which may be proximal, i.e. next to the neck portion. The recess may have a semicircular shape extending from one side to the other side of the outer circumferential rim/lateral surface area of the support plate thereby bridging the transition region between the support plate and the neck portion. In such embodiments, a peripheral/circumferential seal between the support plate and the carrier plate can be provided which may surround the overall outer circumferential edge of the carrier plate. Such continuous circumferential bonding of the molded plastic material between the support and carrier plate provides a solid permanent connection between both plates. In addition, intrusion of saliva and/or other fluids between the carrier and the support plate may be substantially avoided. Alternatively, in some embodiments, substantially no plastic material is molded between the support plate and the carrier plate.

In some embodiments, the molded plastic material may be a relatively hard material, or alternatively, in some embodiments, the molded plastic material may be a relatively soft material. For example the molded plastic material may be a thermoplastic elastomer (TPE) or polypropylene (PP). In case the plastic material is a soft TPE material and the back side of the support plate and, optionally, the outer circumferential rim is covered with said material, a soft bumper may be provided which may avoid unpleased sensation when the head of the oral care implement hits the jaw or soft tissue during use in an oral cavity. In some embodiments the molded plastic material may have a Shore-A hardness of about 40-100, optionally of about 60-100, further optionally of about 70-90 or about 80. Tests revealed that a molded plastic material having a Shore-A hardness of about 80 provides improved permanent, i.e. non-detachable connecting properties between the first and the second part of the oral care implement.

In some embodiments, the soft TPE material may be molded at the back side of the support plate with a structured surface that may in particular be suitable for cleaning soft tissue. The soft TPE may take the form of a soft tissue cleanser, e.g. a tongue cleaner. Such embodiments may provide an overall head thickness which is thinner compared to a head which is composed of a carrier plate which is mounted on a support plate by means of an additional material (e.g. glue or injection molded material) between these two plates and wherein a further soft plastic material is molded over the back side of the support plate as a soft tissue cleanser. A less bulky head of an oral care implement can thus be provided. Consumer tests revealed that a decreased head thickness of an oral care implement provides improved maneuverability and better accessibility of the back molars, for example.

In some embodiments, the soft TPE material may form at least one cleaning and/or massaging element extending from the outer circumferential rim of the head for cleaning and/or massaging the teeth and/or soft tissues of the oral cavity. In some embodiments, said at least one cleaning and/or massaging element may protrude in the same direction as the at least one cleaning element comprised by the carrier plate and may have the form of a finger, for example.

In some embodiments, the front side of the support plate may be a substantially planar surface on which the back side of the carrier plate is secured. Alternatively, in some embodiments, the back side of the carrier plate may have at least one protrusion and/or recess and the front side of the support plate may have at least one corresponding recess and/or protrusion, wherein the at least one protrusion engages into the at least one recess. This may provide a form fit/positive fit and/or a frictional connection between both plates which facilitates the manipulation and handling during the manufacturing process, for example when the carrier plate is set on the support plate prior injection molding the plastic material.

In some embodiments, the second part may further comprise a connecting member, for example a pin, for connecting the second part, i.e. the support plate and the neck portion, with a handle. In some embodiments, the support plate and the neck portion may be molded, optionally injection molded, over the connecting member. Alternatively, the second part may further comprise a handle, which may be molded, optionally injection molded, with the support plate and the neck portion in one single molding/injection molding step. In other words, the support plate, the portion of the neck and the handle may be integrally formed, i.e. they form unitary part. This facilitates the provision of various combinations of cleaning element patterns with several types of handles resulting in a large variety of different oral care implements in a simple and cost saving manner.

The oral care implement, e.g. a toothbrush can be manufactured by the following method:

In a first manufacturing step, a first part comprising a carrier plate is provided. The carrier plate has a back side and a front side which is opposite the back side. At least one cleaning element is fixed/secured to the carrier plate and extends from the front side of said plate. In some embodiments the carrier plate may be made of a hard plastic material. The cleaning element may be every cleaning element described above.

In some embodiments, the cleaning element may be a tuft comprising a plurality of filaments as described above. In some further embodiments a plurality, i.e. more than one tuft may be secured in the carrier plate by means of a hot tufting process which is described in the following: Firstly, the tufts may be formed by providing a desired amount of filaments. Secondly, the tufts may be placed into a mold cavity so that ends of the filaments which are supposed to be attached to the carrier plate extend into said cavity. The opposite ends of the filaments not extending into said cavity may be either end-rounded or non-end-rounded. For example, the filaments may be not end-rounded in case the filaments are tapered filaments having a pointed tip. Thirdly, the carrier plate is formed around the ends of the filaments extending into the mold cavity by an injection molding process, thereby anchoring the tufts in the carrier plate. Before starting the injection molding process, the ends of the tufts extending into the mold cavity may be optionally melted or fusion-bonded to join the filaments together in a fused mass or ball so that the fused masses or balls are located within the cavity. The tufts may be held in the mold cavity by a mold bar having blind holes that correspond to the desired position of the tufts on the finished carrier plate. In other words, the tufts attached to the carrier plate by means of a hot tufting process are not doubled over a middle portion along their length and are not mounted in the head by using an anchor/staple. The tufts may be mounted on the head by means of an anchor-free tufting process.

Optionally, the carrier plate may be molded in a way that the back side of the carrier plate comprises at least one distribution channel and at least one cut-out/hole, e.g. at the outer circumference or at another region of the carrier plate. TPE material may be injected form a central injection point and may distribute along said at least one distribution channel into said at least one cut-out/hole to form at least one elastomeric cleaning and/or massaging element, e.g. in the form of a finger. The at least one elastomer cleaning and/or massaging element may extend substantially perpendicular or in an inclined manner from the front side of the carrier plate.

In a second manufacturing step, a second part comprising a support plate and at least a portion of a neck is provided. The support plate has a front side and a back side which is opposite the front side. In some embodiments, the support plate as well as the portion of the neck may be manufactured in a single molding or injection molding step. In other words, the support plate and the portion of the neck may be integrally formed, i.e. they form a unitary part. In some further embodiments, the second part may further comprise a handle. In such embodiments the support plate, the neck and the handle may be manufactured in one single molding or injection molding step. In other words, the support plate, the portion of the neck and the handle may be integrally formed, i.e. they form a unitary part. Alternatively, the support plate and the portion of the neck may be molded over a connecting member, like a pin. At a later stage a handle may be connected to said connecting member.

In a third manufacturing step, the first and the second part may be placed in a mold cavity in a way that the back side of the carrier plate is placed on the front side of the support plate. Optionally, the first and the second part may be fixed in that position by the mold. The width and/or length extension of the carrier plate may or may not exceed the width and/or length extension of the support plate in order to provide a variety of different head sizes. The part of the surface of the longer/wider plate which exceeds the surface of the respective smaller plate may be over molded with the plastic material during the molding step. In some embodiments, the width extension and/or the length extension of the carrier plate exceeds the width extension and/or length extension of the support plate and the plastic material is molded over the portion of the back side of the carrier plate that exceeds the extension of the support plate. Optionally, the carrier plate may further comprise a lip extending from the back side of the carrier plate and being arranged at least partially around the outer circumference of the carrier plate. The lip may substantially prevent the plastic material from flowing over the outer circumferential edge of the carrier plate during the molding/injection molding process. In other words, the first and second parts of the oral care implement are permanently connected by over molding the plastic material which adheres to both, the back side of the support plate and the back side of the carrier plate. Such embodiments may provide an even and plain surface structure of the back side of the head resulting in superior/comfortable cleaning experience in a user's oral cavity.

In some embodiments, the front side of the support plate may be a substantially planar surface on which the back side of the carrier plate is placed. Alternatively, a carrier plate may be provided wherein its back side has at least one protrusion and/or recess. Further, a support plate may be provided wherein its front side has at least one protrusion and/or recess, which corresponds to the at least one protrusion and/or recess of the carrier plate. In such embodiments, when the back side of the carrier plate is placed on the front side of the support plate, the respective protrusion engages into the corresponding recess and provides a form fit/positive fit and/or a frictional connection between both plates which facilitates the manipulation and handling during the manufacturing process.

In a fourth manufacturing step, a plastic material is molded, optionally injection molded, into the mold cavity and around at least a portion of the back side of the support plate and over at least a portion of the carrier plate thereby providing a non-detachable connection between the first and the second part.

In other words, the first part and the second part are molded separately and are permanently connected together in a further step, namely by over molding a plastic material that adheres to both, the first and the second part. The overall molding process of the oral care implement is split into a series of simple molding/injection molding steps that can be individually optimized. Additional manufacturing steps, like gluing, welding or injection molding further material between the support plate and the carrier plate can be omitted.

The second part comprising the support plate, a portion of the neck and a connecting member can be designed as a universal part or standardized support plate-neck-assembly. Such assembly can be combined with various kinds of carrier plates comprising various types of cleaning element/bristle patterns and/or handles to provide a specific oral care implement. In other words, the second part does not have to be specific to the first part. As the first and the second part are manufactured separately, both parts can be stored separately for a period of time and combined at a later stage. Thus, various kinds of cleaning elements/bristle patterns can be combined with various kinds of handles resulting in a large variety of oral care implements/toothbrush types which can be manufactured in a simple and cost saving manner. For example, in case a new cleaning element/bristle pattern should be combined with an already existing handle type no new cavity for molding said handle type would be necessary, thus, resulting in lower manufacturing costs. Vice versa, in case a new handle type should be combined with an already existing cleaning element/bristle pattern, the cavity for molding the carrier plate comprising the at least one cleaning element does not have to be changed, also resulting in reduced manufacturing costs. For a new type of oral care implement, only the molds that provide the difference versus the former type of oral care implement has to be changed. Consequently, the method for manufacturing an oral care implement in accordance with this disclosure allows a high degree of flexibility in the manufacturing process.

In some embodiments, the first and the second manufacturing steps may be performed in two parallel manufacturing lines.

In some embodiments, the molded plastic material may be a relatively hard or a relatively soft material. For example the molded plastic material may be a thermoplastic elastomer (TPE) or polypropylene (PP). In some embodiments, the plastic material may be molded over and covers substantially the entire back side of the support plate. In some embodiments the soft TPE material may be molded over the back side of the support plate in the form of a soft tissue cleanser, e.g. a tongue cleaner, having a structured surface.

In some embodiments, a carrier plate may be provided which may define an outer circumferential rim which is located between the front side and the back side of the carrier plate. In other words, the outer circumferential rim may be defined as the lateral surface area of the carrier plate. In some embodiments, the plastic material may be molded at least partially around said outer circumferential rim. In some further embodiments, the plastic material may be molded around the overall outer circumferential rim of the carrier plate. This may provide a unitary surface of the backside and lateral surface of the head of the oral care implement providing a superior user experience during a cleaning process. Further, a remaining gap between the support plate and the carrier plate may be sealed along the outer circumference of the head.

In case the plastic material is a soft TPE material and the back side of the support plate and, optionally, the outer circumferential rim is covered with said material, a soft bumper may be provided which may avoid unpleased sensation when the head of the oral care implement hits the jaw or soft tissue during use in the oral cavity.

In some embodiments, the method may comprise the step wherein a carrier plate is provided having a recess on the back side and/or a support plate having a recess on the front side. The recess(es) form(s) a channel between the back side of the carrier plate and the front side of the support plate when the carrier and the support plate are placed upon each other. During the molding step, i.e. when the plastic material is molded around at least a portion of the back side of the support plate and over at least a portion of the carrier plate, the plastic material is also molded into said channel.

In some embodiments, said recess may be provided on the back side of the carrier plate and/or on the front side of the support plate at a position which may be proximal, i.e. next to the neck portion. The channel may be arranged such that it forms a circumferential sealing along at least a portion of the outer edge of the support plate and the carrier plate. The recess may extend from one side to the other side of the outer circumferential rim/lateral surface area of the support plate thereby bridging the transition region between the support plate and the neck portion. In such embodiments a peripheral/circumferential seal between the support plate and the carrier plate can be provided when the plastic material is molded over the first and second part of the oral care implement. After said molding step, the plastic material may surround the overall outer circumferential edge of the carrier plate. Such continuous circumferential bonding of the molded plastic material between the support and carrier plate provides a solid permanent connection between both plates. In addition, intrusion of saliva and/or other fluids between the carrier and the support plate can be substantially avoided during the use of the oral care implement.

An oral care implement manufactured by such method comprises a head having a pattern of cleaning elements, a handle and a neck extending between the head and the handle.

The following is a non-limiting discussion of an example embodiment of an oral care implement, parts thereof and of a method for manufacturing the same in accordance with the present disclosure, where reference to the figures is made.

Figure 3:
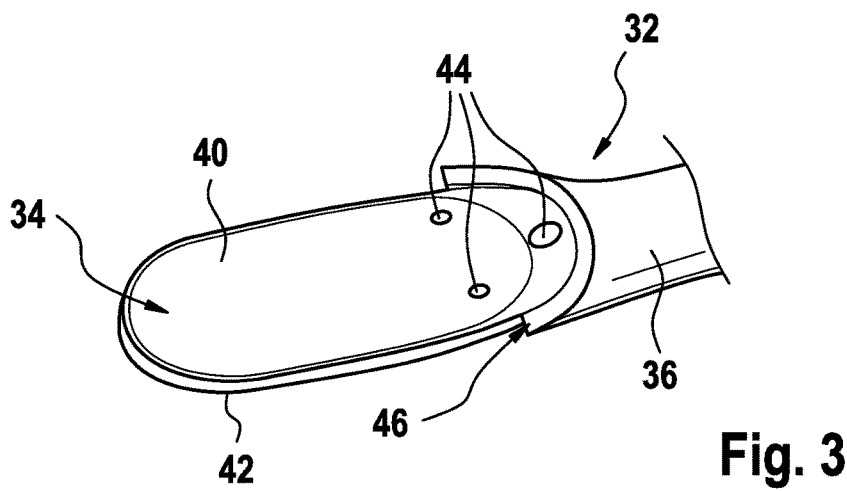
FIG. 3 shows another perspective view of the second part of FIG. 2.
Figure 4:
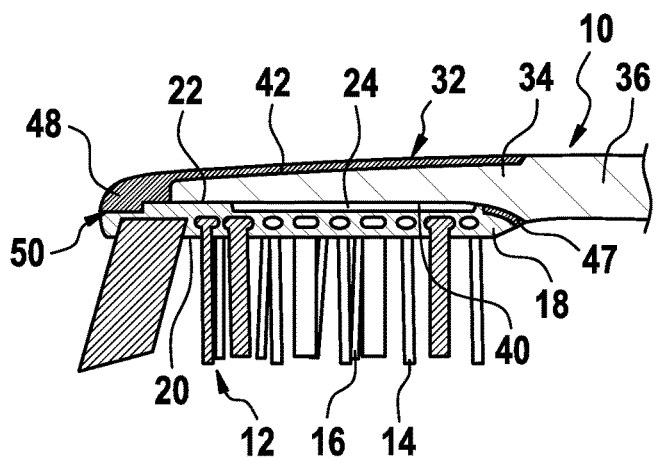
FIG. 4 shows a schematic cross sectional view of the example embodiment of an oral care implement comprising the first part of FIG. 1 and the second part of FIG. 2.
Figure 5:
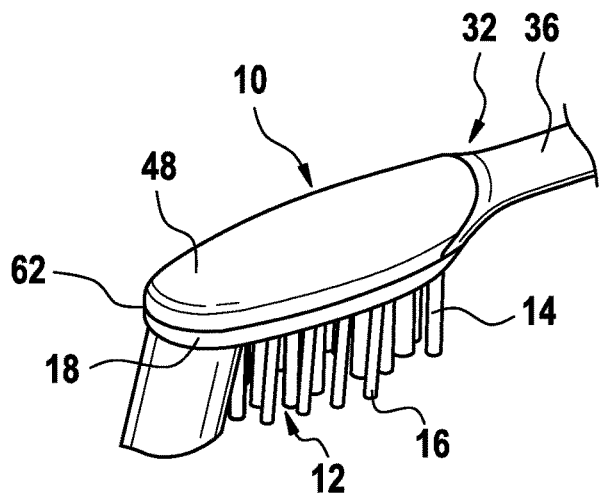
FIG. 5 shows a perspective view of the oral care implement of FIG. 4.

An oral care implement 10, for example a manual toothbrush 10 as shown in FIGS. 4 and 5 comprises a first part 12 (illustrated in FIG. 1) and a second part 32 (shown in FIGS. 2 and 3) which are permanently secured to each other by means of an injection molding process.

FIG. 1 shows a perspective view of the first part 12 of the oral care implement 10. A plurality of tufts 14 composed of filaments may have been secured to a carrier plate 18 by means of a hot tufting process as described above. The tufts 14 extend from a front side 20 of the carrier plate 18. A plurality of distribution channels 24 may be provided on the back side 22 of the carrier plate 18 through which a soft elastomeric material 28 is injection molded to provide massaging/cleaning elements 16 which reach through cutouts/holes 26 in the carrier plate 18 and extend from the front side 20 of the carrier plate 18. In addition, three protrusions 30 may be provided on the back side 22 of the carrier plate 18 which facilitate the placement of the first part 12 on the second part 32. The carrier plate 18 may further comprise a lip 29 extending from the back side 22 of the carrier plate 18. The lip 29 may be arranged at least partially around the outer circumference 31 of the carrier plate 28.

Figure 2:
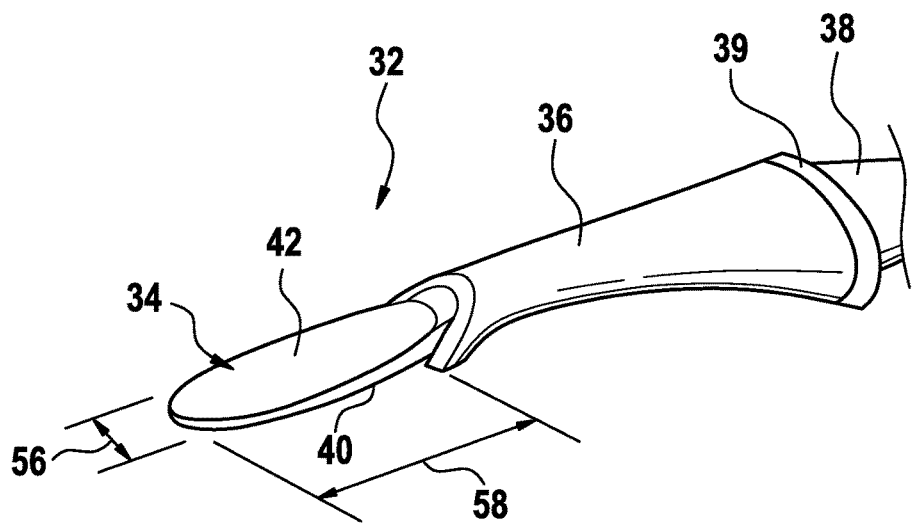
FIG. 2 shows a perspective view of a second part of the example embodiment of an oral care implement.

FIG. 2 shows a perspective back view and FIG. 3 shows a perspective front view of the second part 32 of the oral care implement 10. The second part 32 comprises an elongated support plate 34 as well as a portion of a neck 36. The support plate 34 and the neck portion 36 may be injection molded over a pin 38 as a connecting member to which a handle (not shown) can be attached/connected at a later stage. A ring 39, e.g. used as an identification element, may be further provided at the neck portion 36, e.g. by injection molding. When the handle of the oral care implement is attached to the pin 38, the ring 39 may be located between the neck portion 36 and the handle. However, the second part 32 can also comprise the support plate 34, the neck portion 36 and the handle without a connecting member 38 and can be manufactured in one single injection molding step.

The support plate 34 has a front side 40 and a back side 42 which is opposite the front side 40. The front side 40 of the support plate 34 comprises three recesses 44 which correspond to the protrusions 30 of the carrier plate 18. The protrusions 30 on the back side 22 of the carrier plate 18 engage with the recesses 44 on the front side 40 of the support plate 34 once both plates 18, 34 are placed upon each other and provide a form fit/positive fit and/or a frictional connection between both plates 18, 34.

The front side 40 of the support plate 34 further comprises a recess 46 forming a channel 47 between the back side 22 of the carrier plate 18 and the front side 40 of the support plate 34 once both plates 18, 34 are placed upon each other. The recess 46 has a semicircular shape thereby bridging the transition region between the support plate 34 and the neck portion 36.

As shown in FIGS. 4 and 5 the back side 22 of the carrier plate 18 is secured to the front side 40 of the support plate 34 by means of a plastic material 48 which is injection molded around the back side 42 of the support plate 34 and over a portion 50 of the carrier plate 18 to provide a non-detachable connection between the first part 12 and the second part 32 of the oral care implement 10.

The carrier plate 18 has a width 52 and a length 54 extension and the support plate 34 has also a width 56 and a length 58 extension (cf. FIGS. 1 and 2). The width extension 52 and the length extension 54 of the carrier plate 18 exceeds the width extension 56 and the length extension 58 of the support plate 34 and the plastic material is molded over the portion 50 of the back side 22 of the carrier plate 18 which exceeds the extension of the support plate 34. The lip 29 extending from the back side 22 of the carrier plate 18 may substantially prevent the plastic material 48 from flowing over the outer circumferential edge 60 of the carrier plate 18 during the injection molding process. Further, the plastic material may also be injection molded into the channel 47 in order to provide a peripheral/circumferential seal between the support plate 34 and the carrier plate 18. Such continuous circumferential bonding of the molded plastic material 48 between the support and carrier plate 34, 18 may provide a solid permanent connection between both plates 34, 18. In addition, intrusion of saliva and/or other fluids in between the carrier and the support plate 18, 34 may be substantially avoided.

However, the plastic material 48 can also be at least partially injection molded around an outer circumferential rim 62 of the carrier plate 18. The outer circumferential rim 62 is defined between the front side 20 and the back side 22 of the carrier plate 18.

The plastic material 48 can be a relatively hard or a relatively soft material. For example the molded plastic material can be a thermoplastic elastomer (TPE) or polypropylene (PP). In case the plastic material is a soft TPE material said material 48 can be molded over the back side 42 of the support plate 34 in the form of a soft tissue cleanser, e.g. a tongue cleaner, having a structured surface (not shown). In some embodiments the molded plastic material may have a Shore-A hardness of about 40-100, optionally of about 60-100, further optionally of about 70-90 or about 80. Tests revealed that a molded plastic material having a Shore-A hardness of about 80 provides improved bonding properties between the first and the second part of the oral care implement.

Figure 6:
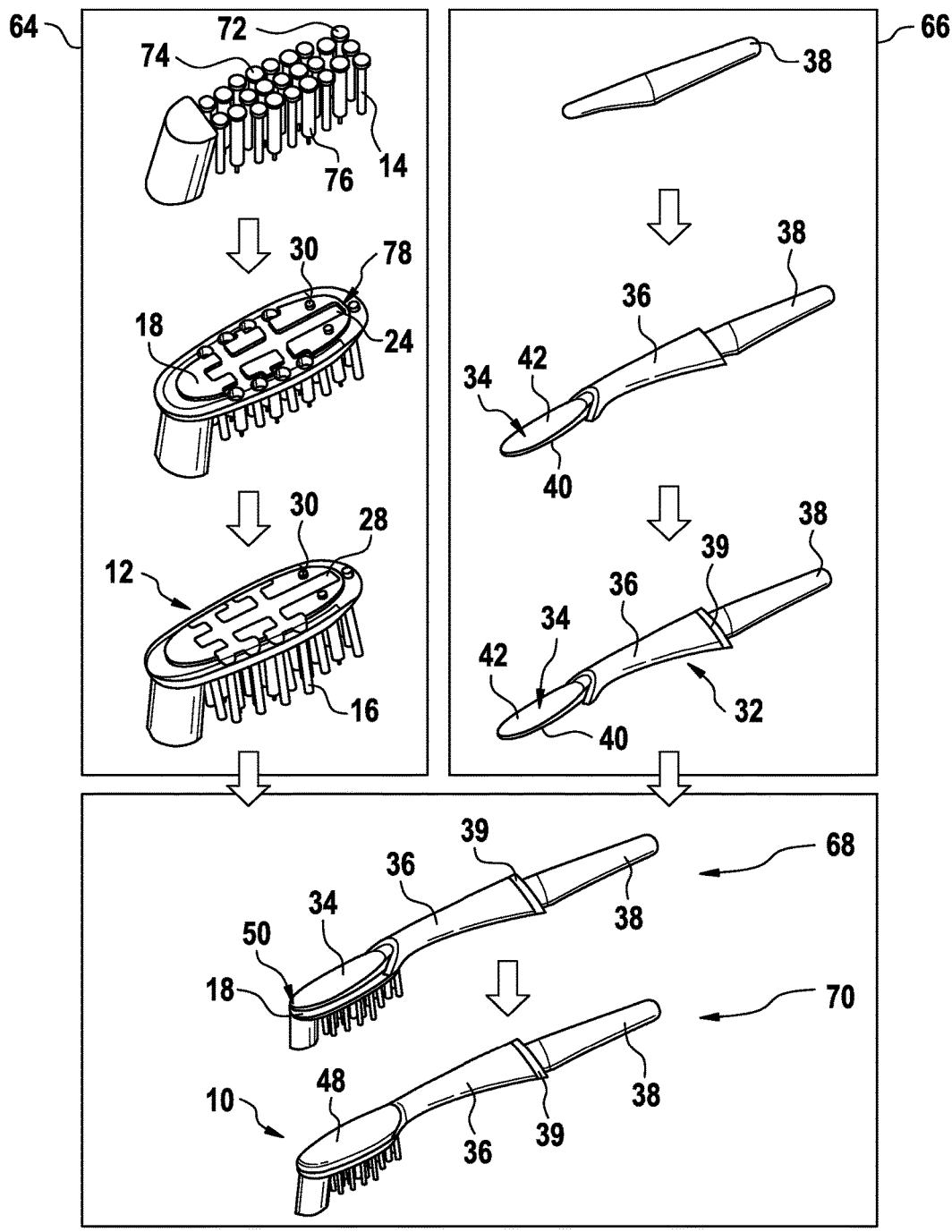
FIG. 6 shows a schematic overview of method steps for manufacturing an oral care implement.

FIG. 6 illustrates a process flow description for manufacturing the oral care implement 10 (handle is not shown).

In a first manufacturing step 64 the first part 12 comprising the carrier plate 18 and at least one cleaning elements 16 extending from the front side 20 of the carrier plate 18 may be provided by means of a hot tufting process: Firstly, tufts 14 may be formed by providing a desired amount of filaments. Secondly, the tufts 14 may be placed into a mold cavity (not shown) so that ends 74 of the filaments which are supposed to be attached to the carrier plate 18 extend into said cavity. The opposite ends 76 of the filaments not extending into said cavity may be either end-rounded or non-end-rounded. For example, the filaments may be not end-rounded in case the filaments are tapered filaments having a pointed tip. Before starting an injection molding process to form the carrier plate 18 around the tufts 14, the ends 74 of the tufts 14 extending into the mold cavity may be melted or fusion-bonded to join the filaments together in a fused mass or ball 72 so that the fused masses or balls 72 are located within the cavity. Thirdly, the carrier plate 18 is formed around the ends 74 of the filaments extending into the mold cavity by the injection molding process, thereby anchoring the tufts 14 in the carrier plate 18. The tufts 14 may be held in the mold cavity by a mold bar (not shown) having blind holes that correspond to the desired position of the tufts 14 on the finished carrier plate 18. The carrier plate 18 may be molded in a way that the back side 22 of the carrier plate 18 comprises distribution channels 24 and cut-outs/holes 26 at the outer circumference of the carrier plate 18. TPE material may be injected form a central injection point 78 and may distribute along said distribution channels 24 into said cut-out/holes 26 to form elastomeric cleaning and/or massaging elements 16, e.g. in the form of a finger. The elastomeric cleaning and/or massaging elements 16 may extend substantially perpendicular or in an inclined manner from the front side 20 of the carrier plate 18. Further, the carrier plate 18 may be molded in a manner that the back side 22 of the carrier plate 18 further comprises protrusions 30 which are supposed to engage with corresponding recesses 44 of the support plate 34.

In a second manufacturing step 66 the second part 32 comprising the support plate 34, the neck portion 36, the connecting member 38 and the ring 39 is provided. Firstly, the connecting member 38 is injection molded. Secondly, the neck portion 36 as well as the support plate 34 are injection molded over the connecting member 38 in a single injection molding step. The support plate 34 has a front side 40 and a back side 42 and is molded in a way that the front side 40 comprises recesses 44 which correspond to the protrusions 30 on the back side 22 of the carrier plate 18 as well as a recess 46. The recess 46 is provided proximal to the neck portion 36 and bridges the region between the support plate 34 and the neck portion 36.

In a third manufacturing step 68 the first part 12 and the second part 32 may be placed in a mold cavity (not shown) in a way that the back side 22 of the carrier plate 18 is placed on the front side 40 of the support plate 34. When the back side 22 of the carrier plate 18 is placed on the front side 40 of the support plate 34, the respective protrusions 30 of the carrier plate 18 and recesses 44 of the support plate 34 engage and provide a form fit/positive fit and/or a frictional connection between both plates 18, 34. Further, the recess 46 on the front side 40 of the support plate 34 which is located proximal to the neck portion 36 forms the channel 47. The first and the second part 12, 32 may be fixed in that position by the mold. The width 52 and length 54 extension of the carrier plate 18 may exceed the width 56 and length 58 extension of the support plate 34 by the portion 50.

In a fourth manufacturing step 70, the plastic material 48 is injection molded around the back side 42 of the support plate 34, over the portion 50 of the carrier plate 18 which exceeds the support plate 34 and into the channel 47. The lip 29 extending from the back side 22 of the carrier plate 18 partially along its outer circumference 31 substantially prevents the plastic material 48 from flowing over the outer circumferential edge 60 of the carrier plate 18 during the injection molding process. The plastic material 48 adheres to both, the first and the second part 12, 32 of the oral care implement 10, thereby providing a non-detachable connection.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

What is claimed is:

1. An oral care implement comprising
a first part comprising a carrier plate having a back side and a front side opposite the back side, and at least one cleaning element extending from the front side; and
a second part comprising a support plate and at least a portion of a neck, the support plate having a front side and a back side opposite the front side;
wherein the back side of the carrier plate is secured to the front side of the support plate by a plastic material molded around at least a portion of the back side of the support plate and over at least a portion of the carrier plate to provide a non-detachable connection between the first and the second part and wherein at least one of the back side of the carrier plate and the front side of the support plate comprises a recess forming a channel between the back side of the carrier plate and the front side of the support plate and the molded plastic material fills the channel.

2. An oral care implement according to claim 1, wherein each of the carrier plate and the support plate has a width extension and a length extension, wherein the width extension of the carrier plate exceeds the width extension of the support plate, and wherein the plastic material is molded over a portion of the back side of the carrier plate that exceeds the width extension of the support plate.

3. An oral care implement according to claim 1, wherein each of the carrier plate and the support plate has a width extension and a length extension, wherein the length extension of the carrier plate exceeds the length extension of the support plate, and wherein the plastic material is molded over a portion of the back side of the carrier plate that exceeds the length extension of the support plate.

4. An oral care implement according to claim 1, wherein the carrier plate has an outer circumferential rim between the front side and the back side of the carrier plate and the molded plastic material is molded at least partially around the outer circumferential rim.

5. An oral care implement according to claim 1, wherein the recess is formed at least partially in the back side of the carrier plate.

6. An oral care implement according to claim 1, wherein the recess is formed at least partially in the front side of the support plate.

7. An oral care implement according to claim 1, wherein the molded plastic material is a soft material.

8. An oral care implement according to claim 1, wherein the molded plastic material is a soft material, and the molded plastic material is arranged at the back side of the support plate having a structured surface suited for tissue cleansing.

9. An oral care implement according to claim 1, wherein the molded plastic material forms at least one massaging element extending from an outer circumferential rim of the carrier plate.

10. An oral care implement according to claim 1, wherein the back side of the carrier plate has at least one protrusion and the front side of the support plate has at least one corresponding recess, wherein the at least one protrusion engages into the at least one recess.

11. An oral care implement according to claim 1, wherein the back side of the carrier plate has at least one recess and the front side of the support plate has at least one corresponding protrusion, wherein the at least one protrusion engages into the at least one recess.

12. An oral care implement according to claim 1, wherein the second part further comprises a connecting member for connecting the second part with a handle.

13. An oral care implement according to claim 1, wherein the second part further comprises a handle.

* * * * *